April 27, 1965     E. E. FARIS ETAL     3,180,466
CLUTCH ASSEMBLY FOR SELF-PROPELLED SNOW BLOWER
Filed Nov. 30, 1961     2 Sheets-Sheet 1

INVENTORS.
ELVIN E. FARIS and
BY RUSSELL C. RICHARDSON
Lockwood, Woodard, Smith & Weikart
Attorneys April 27, 1965 E. E. FARIS ETAL 3,180,466
CLUTCH ASSEMBLY FOR SELF-PROPELLED SNOW BLOWER
Filed Nov. 30, 1961 2 Sheets-Sheet 2

INVENTOR.
ELVIN E. FARIS and
BY RUSSELL C. RICHARDSON

Lockwood, Woodard, Smith & Weikart
Attorneys

United States Patent Office 3,180,466
Patented Apr. 27, 1965

3,180,466
CLUTCH ASSEMBLY FOR SELF-PROPELLED SNOW BLOWER
Elvin E. Faris and Russell C. Richardson, Cicero, Ind., assignors to Power Equipment, Inc., Cicero, Ind., a corporation of Indiana
Filed Nov. 30, 1961, Ser. No. 156,071
3 Claims. (Cl. 192—83)

This invention relates generally to transmission clutch assemblies and in particular to a clutch assembly adapted for use in controlling the application of motive power to small, self-propelled, hand guided applicances such as snow blowers.

In conventional self-propelled devices such as power-operated snow blowers, the transmission clutch is moved by a simple lever system, actuated by hand or foot of the operator, into engaged or disengaged position. These conventional clutches suffer from the disadvantage that, under heavy operating load conditions, the drive is very difficult to disengage and a speed reduction is normally required before the shift action can be completed.

The present invention has as its primary object the provision of a clutch assembly for self-propelled snow blowers or the like which can be clutched or declutched by finger pressure at any speed or torque.

A further object of the present invention is to provide a clutch assembly of the type referred to above in which the finger-operated control member may be located at the guiding hand grips of the device remote from the clutch device itself.

A further object of the present invention is to provide a clutch device of the type referred to which effects a declutching action immediately upon release of the finger operated control member to provide a "dead man" control action.

A further object of the present invention is to provide a clutch assembly of the type referred to having an over-riding safety lockout or auxiliary clutch control which is capable of holding the assembly in declutched condition independently of the position of the finger operated, remote control member.

These and other objects will become apparent as the description proceeds with reference to the accompanying drawings in which.

Figures 1, 4, 5:
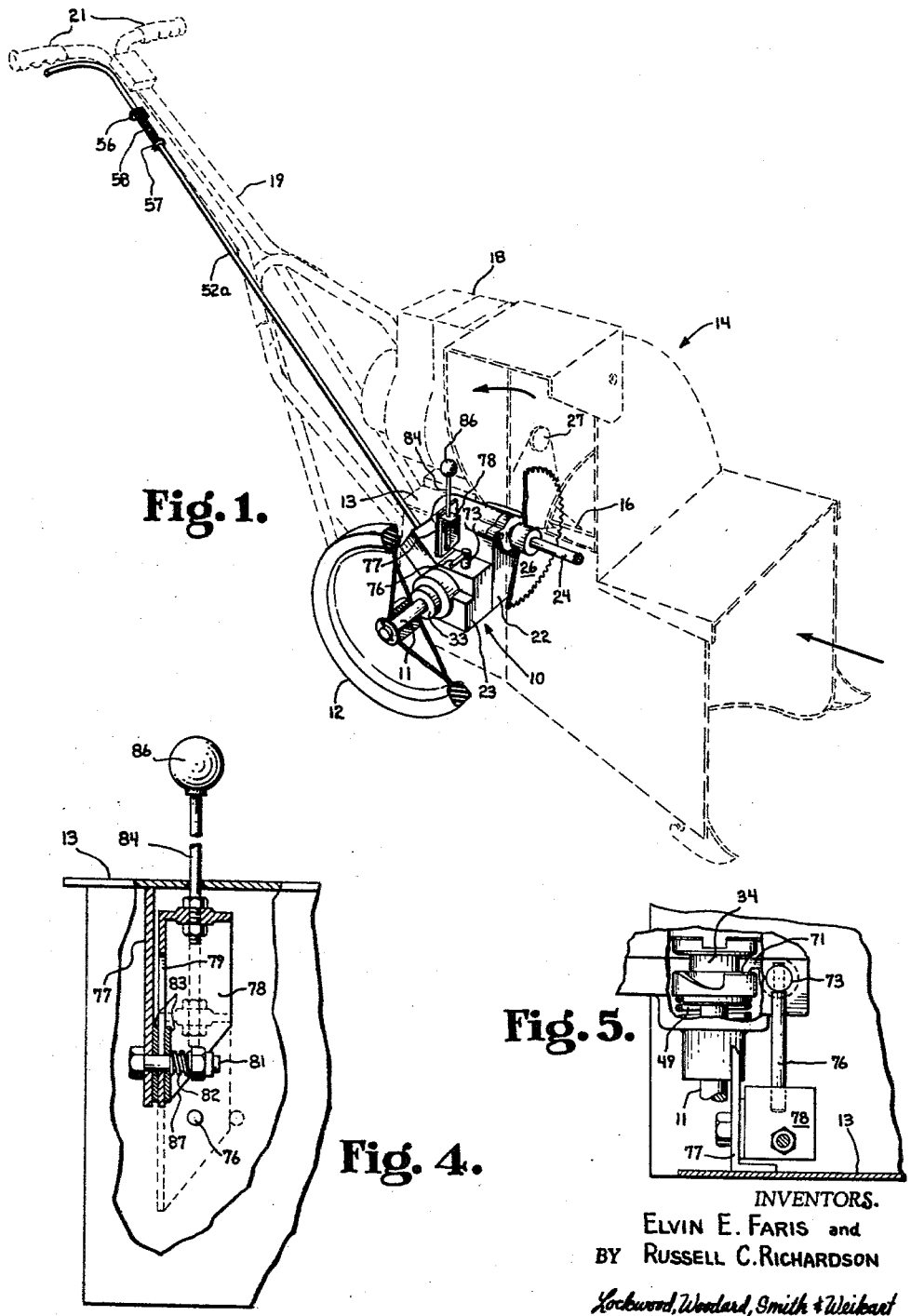
FIG. 1 is a perspective view of a self-propelled snow blower incorporating the present invention, the portion of the snow blower serving merely as environment for the present invention being shown in broken lines.
FIG. 4 is a fragmentary, sectional, side view of a portion of the structure shown in FIG. 1.
FIG. 5 is a top plan view of the structure shown in FIG. 4 with portions broken away to clarify the internal construction.

Referring initially to FIG. 1, the clutch assembly of the present invention is indicated generally at 10. Extending through the assembly is a driven shaft or axle 11 which carries at each of its ends wheels 12 (only one wheel being visible in FIG. 1). The assembly 10 is supported on the interior of a sheet metal housing 13 which is properly apertured to accommodate the control elements extending to the exterior of the housing as will subsequently be described. The housing forms a part of the snow blower body indicated generally at 14. The details of construction of the snow blower itself do not form a part of the present invention and are therefore not described in detail. The snow blower includes a frontal inlet aperture through which snow moves as the blower is advanced forwardly by the wheels, the entry of snow being in the direction of the arrow in FIG. 1. The structure includes a rotary blade 16 which, when rotated, expels snow sidewardly from the structure as indicated by the arrow in FIG. 1. The structure further includes a small internal combustion engine 18 which serves as a prime mover for the device. A guiding handle assembly 19 extends from the structure and is provided with dual hand grips 21. The housing for the clutch assembly is composed of a rear portion 22 and a front portion 23. The upper section of the rear portion 22 has extending therefrom a drive shaft 24, the axis of the shaft 24 being transverse to the axis of the shaft or axle 11. The shaft 24 has rotationally locked thereto a sprocket 26 which is driven through a chain transmission by a sprocket 27 which is directly mounted on a crank shaft of the engine 18. The snow propelling blade 16 is mounted directly on the forward end of the shaft 24 and is rotated thereby. It may thus be seen that rotation of the engine crank shaft is transmitted by the chain drive to the shaft 24 and to the snow propelling blade 16. The transmission of rotation of the shaft 24 to the shaft 11 is controlled by the clutch assembly 10 shown in detail in FIGS. 2–5.

Figure 2:
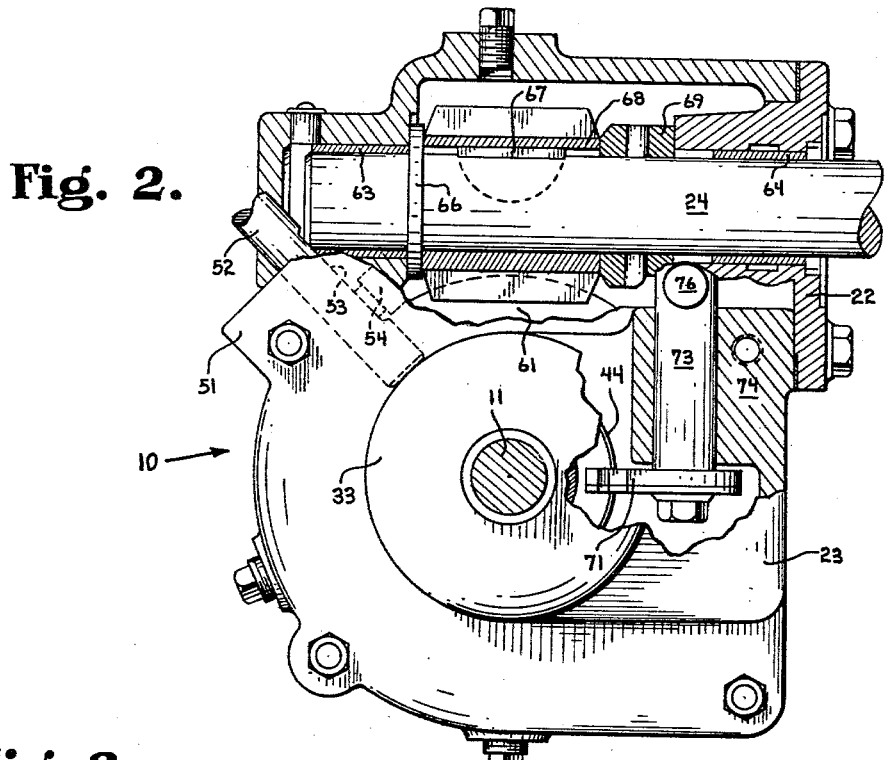
FIG. 2 is a side view of the clutch assembly of the present invention with portions broken away to illustrate the internal construction.
Figure 3:
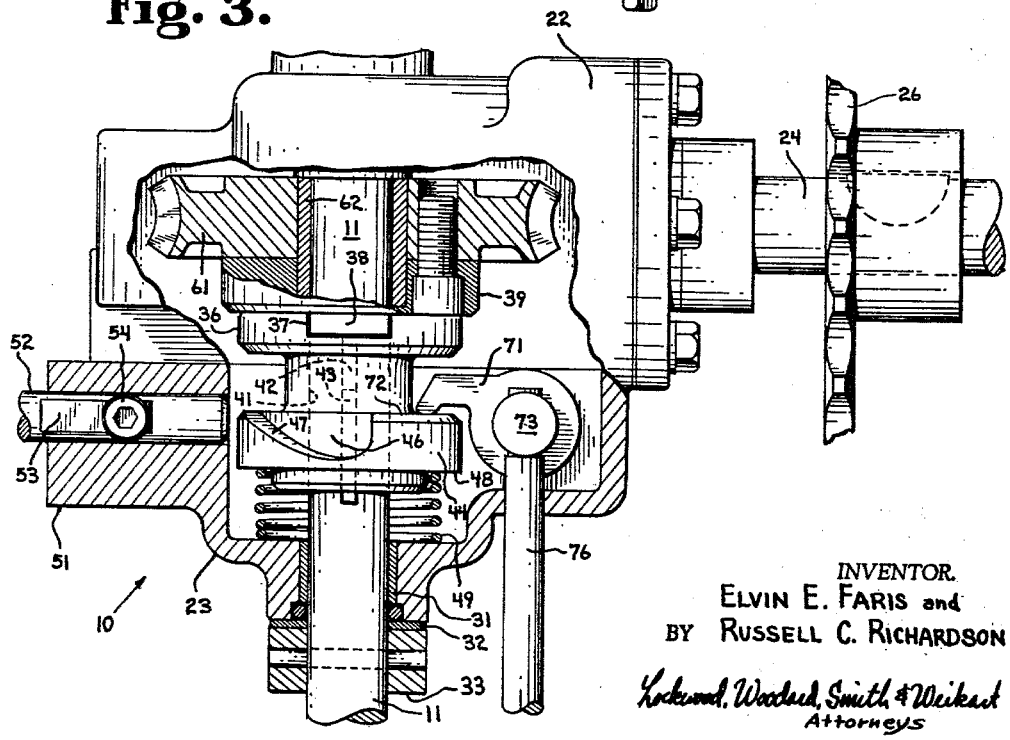
FIG. 3 is a top plan view of the device of FIG. 1 with parts broken away to illustrate the internal construction.

Referring to FIGS. 2 and 3, the frontal housing portion or casting 23 is apertured to permit the shaft 11 to extend therethrough and accommodates an anti-friction bearing 31, a thrust bearing 32 and a retaining collar 33 which is pinned to the shaft 11. As previously mentioned, the shaft 11 extends completely through the housing and is journalled in the rear housing casting 22 by a bearing assembly (not shown) substantially identical to the bearings 31–32 just described. Interiorly of the housing, the shaft 11 carries a sleeve or movable clutch member 34. One end of the sleeve is flanged outwardly as indicated at 36, the end face of the flanged portion 36 being cut away as indicated at 37 to accommodate extending portions 38 of a male clutch member 39. It will be understood that the extending portions 38 and the mating cut away portions 37 provide rotary motion transmitting elements between the clutch member 39 and the sleeve 34. The shaft 11 extends freely through a central bore 41 in the sleeve 34. The sleeve bore is provided with a longitudinal groove 42 which receives a key 43 fixed to the shaft and extending beyond the surface thereof. It will be understood that the mounting thus provided for the sleeve 34 locks it rotationally to the shaft 11 but permits displacement of the sleeve axially along the shaft.

The end of the sleeve 34 opposite the flanged portion 36 is also outwardly flanged as indicated at 44 and this flanged portion is provided with a curved or inclined indentation or groove 46. The flanged portion 44 with its groove 46, in effect, provides an abutment on the sleeve which presents an elongated face 47 facing in the direction of the clutch member 39. It will be noted that the plane of the face 47 is curved transversely to the shaft axis, although, under certain operating requirements this face might be linearly inclined to the shaft axis rather than curved. The end face 48 of the flanged portion 44 seats a compression spring 49 which bottoms on the housing casting 23.

The housing casting 23 is formed to provide a sidewardly extending boss 51 which is provided with an aperture through which an actuating member in the form of a pin 52 freely extends. The pin is positioned radially of the shaft 11 and the limits of its reciprocal motion are determined by the length of a groove 53 in the pin which accommodates the tip of a screw 54 received within the housing portion 51.

The pin 52 is linked by any suitable means, or might be formed integrally with, an extension of the actuating member or pin identified at 52a in FIG. 1. The pin extension 52a extends upwardly along the handle 19 and at its upper end is formed to extend sidewardly adjacent one of the hand grips 21. The pin extension 52a is supported by its extension through a bracket 56 rigidly attached to the handle 19. The shank of the pin extension receives a cotter key which supports a washer 57. Resilient means in the form of a compression spring 58 extends between the washer 57 and the underside of the bracket 56 and biases the pin extension 52a and the pin 52 radially inwardly with respect to the shaft 11. As viewed in FIGS. 2 and 3 the pin 52 is in retracted position, that is, the position the pin would assume when the force of spring 58 (FIG. 1) has been overcome by actuation of the pin extension 52a upwardly.

Returning specifically to FIG. 3, the axially stationary clutch member 39 is rigidly attached to the adjacent face of a worm gear 61. The worm gear 61 and the attached clutch member 39 are both free to rotate with respect to the shaft 11 and are supported by the anti-friction bearing 62.

Referring now to FIG. 2, the upper portion of the housing casting 22 journals, by means of anti-friction bearings 63 and 64 and thrust bearing 66, the shaft 24 previously mentioned with respect to FIG. 1. The shaft 24 extends exteriorly of the housing and carries the sprocket 26. Locked to the shaft 24 by means of the Woodruff key 67 is a worm gear 68 which meshes with the worm gear 61, the gears providing the conventional worm and wheel connection so that rotation of shaft 24 is transferred to the gear 61. A collar 69, pinned to the shaft 24 locates the gear 68 on the shaft.

The auxiliary or safety lockout mechanism, effective to declutch the assembly independently of the position of the pin 52 will now be described with reference to FIGS. 1-5. This portion of the assembly includes an arm 71 (FIG. 3) which engages the inner face 72 of the flange portion 44 on the sleeve 34. The arm 71 is mounted for angular movement within the housing by means of a pin 73 which extends freely through an internal boss 74 in the housing casting. At the end of the pin 73 opposite its attachment to the arm 71 it receives by press fit a pin 76 (FIG. 3) which extends normal to the axis of the pin 73. As will be evident from FIG. 1 the end of the pin 73 carrying the sidewardly extending pin 76 is exterior of the housing 10 but within the sheet metal enclosure 13. A bracket 77 (FIG. 5), welded or otherwise suitably attached to the inner surface of the sheet metal hood or housing 13, supports a slide member 78. The slide member is generally L-shaped in cross-section and one face thereof carries an elongated slot 79 which accommodates a bolt 81 (FIG. 4). The shank of the bolt carries a compression spring 82 which exerts force on the friction plates 83 adjacent the slotted portion of the slide 78. The bolt 81 extends through an aperture in the bracket 77 and, cooperating with the friction plates 83, exerts a frictional force resisting downward motion of the slide 78 with relation to the bolt 81. The upper end of the slide 78 has a horizontally extending portion which rigidly supports a shaft 84, carrying a knob 86 at its free end. The shaft 84 extends upwardly and freely through an aperture in the hood or housing 13 and is accessible from the exterior thereof.

As may best be seen in FIG. 4, the lower end of the slide 78 is provided with an inclined edge 87 which, upon downward motion of the slide is adapted to engage the pin 76 and cam it sidewardly as indicated by broken lines in FIG. 4.

In operation, with the engine 18 rotating the chain drive, power will be transmitted through the sprocket 26 to the worm gear 68. The worm gear 68 will rotate the gear 61. With the actuating pin 52 in retracted position as shown in FIGS. 2 and 3, the spring 49 will force the sleeve 34 toward the gear 61 so that the motion transmitting elements 36 and 38 will be engaged. Power will thus be transferred to the shaft or axle 11, the axle rotating in the direction indicated by the arrow in FIG. 3. With the clutch thus engaged, the wheels 12 will be rotated under the driving power supplied by the engine 18.

To disengage the clutch the rod extension 52a is released so that the spring 58 moves the actuating pin 52 against the adjacent periphery of the sleeve portion 44. As the groove 46 rotates to a position beneath the end of the pin 52 the pin will drop into the groove and continued rotation of the sleeve 34 will cause the pin to traverse the abutment face 47 camming the sleeve 34 away from the gear 61 and causing the pin to ride on the end face 72 of the sleeve portion 44. As the sleeve 34 is cammed away from the gear 61, the motion transmitting elements 36 and 38 will be disengaged from each other and, though the gear 61 continues to rotate, the sleeve 34 and the shaft 11 will cease rotation.

In the event that the snow blower is to be operated manually, that is, without the self-propelled feature, and to provide a safety declutching means during starting of the engine, the auxiliary declutching device provided by arm 71 and associated parts is utilized. With the knob 86 in the position shown in FIGS. 1 and 4 the pin 76 will also be in the position there shown. Correspondingly, the arm 71 will assume the position indicated in FIG. 3 and will exert no declutching force on the sleeve 34. If the knob 86 is now moved downwardly lowering the slide 78, the inclined edge 87 of the slide will cam the pin 76 sidewardly as indicated in FIG. 4. This sideward movement of the pin 76 rotates the pin 73 counterclockwise as viewed in FIG. 3 causing the free end of the arm 71 to engage the face 72 of the sleeve portion 44 moving it away from the gear 61 thereby declutching the motion transmitting elements 36 and 38. Since the inclined edge 87 of slide 78 provides a one-way driving connection between the knob 86 and the arm 71, that is, since spring 49 cannot drive back through the edge 87 and pin 76, the sleeve 34 will be held in declutched position by the arm 71 independently of the position of the actuating pin 52. Subsequent manual raising of the knob 86 and the consequent upward motion of the slide 78 again places the sleeve 34 under control of the actuating pin 52.

From the foregoing it will be evident that the clutch assembly of the present invention, through the medium of the pin 52 and the abutment face 47, utilizes the torque of the engine itself to cam the sleeve 34 into disengaged position. Clutching and declutching can thus be accomplished without reducing speed or lowering the torque load on the structure. Control of the clutching action by means of the radially extending actuating pin 52 lends itself to the "dead man" type of control illustrated wherein finger pressure must be maintained on the sidewardly extending portion of the rod extension 52a in order to maintain the clutch engaged. While the drawings, particularly FIGS. 2 and 3 disclose various oil cavities and passages for the circulation of lubricating oil within the clutch housing, these have not been described in detail herein since they are conventional and form no part of the present invention. While the invention is here disclosed as applied to a self-propelled snow blower, it will be understood that the clutch assembly could also be applied to other self-propelled devices such as power lawnmowers or the like.

While the invention has been disclosed and described in some detail in the drawings and foregoing description, they are to be considered as illustrative and not restrictive in character, as other modifications may readily suggest themselves to persons skilled in this art and within the broad scope of the invention, reference being had to the appended claims.

We claim:

1. A clutch assembly for controlling the application of motive power to the wheels of a self-propelled snowblower or the like; said assembly comprising: a driven shaft, a worm gear journalled for free rotation on the shaft and driven by a prime mover to thereby serve as a driving member for the assembly, a sleeve carried on and rotationally locked to said shaft but capable of movement along the shaft axis, engageable motion transmitting elements carried by one side face of said gear and by the adjacent end face of said sleeve, resilient means acting on said sleeve to urge said elements into motion transmitting engagement to thereby transfer rotary motion from said gear to said shaft, an abutment formed on the outer side surface of said sleeve presenting an elongated face toward said one side face of the gear, the plane of said face being curved transversely to the shaft axis, an actuating member mounted for reciprocal motion radially of said shaft between a first position in engagement with said abutment face and a second position clearing said abutment face, control means for said actuating member comprising manually operable means for moving said actuating member to its said second position and biasing means for urging said actuating member into its said first position, whereby with said actuating member in its said second position said motion transmitting elements are engaged and rotary motion is transferred from said gear to said shaft, and when said actuating element is shifted to its said first position rotation of said sleeve causes said actuating element to traverse said abutment face thereby camming said sleeve axially away from said gear to disengage said motion transmitting elements and terminate the drive to said shaft, additional manually operable auxiliary means for disengaging said motion transmitting elements independently of the position of said actuating member, said auxiliary means comprising an arm mounted adjacent said sleeve for angular motion about an axis normal to the axis of said shaft, the free end of said arm as it moves through one sector of its motion engaging said sleeve and moving the sleeve away from said gear to disengage said motion transmitting elements, and manually actuated means for angularly moving said arm through said motion sector.

2. A clutch assembly for controlling the application of motive power to the wheels of a self-propelled snowblower or the like; said assembly comprising: a driven shaft, a worm gear journalled for free rotation on the shaft and driven by a prime mover to thereby serve as a driving member for the assembly, a sleeve carried on and rotationally locked to said shaft but capable of movement along the shaft axis, engageable motion transmitting elements carried by one side face of said gear and by the adjacent end face of said sleeve, resilient means acting on said sleeve to urge said elements into motion transmitting engagement to thereby transfer rotary motion from said gear to said shaft, an abutment formed on the outer side surface of said sleeve presenting an elongated face toward said one side face of the gear, the plane of said face being curved transversely to the shaft axis, an actuating member mounted for reciprocal motion radially of said shaft between a first position in engagement with said abutment face and a second position clearing said abutment face, control means for said actuating member comprising manually operable means for moving said actuating member to its said second position and biasing means for urging said actuating member into its said first position, whereby with said actuating member in its said second position said motion transmitting elements are engaged and rotary motion is transferred from said gear to said shaft, and when said actuating element is shifted to its said first position rotation of said sleeve causes said actuating element to traverse said abutment face thereby camming said sleeve axially away from said gear to disengage said motion transmitting elements and terminate the drive to said shaft, means for disengaging said motion transmitting elements independently of the position of said actuating member, said means comprising an arm mounted for angular movement adjacent said sleeve, said arm engaging said sleeve and shifting it along the axis of said shaft to disengage said motion transmitting elements as said arm moves toward one limit of its angular motion, a manually movable element, and a one-way driving connection between said manually movable element and said arm whereby manipulation of said movable element actuates said arm toward its said angular motion limit against the force exerted by said resilient means.

3. A clutch assembly for controlling the applicataion of motive power to the wheels of a self-propelled snowblower or the like; said assembly comprising: a driven shaft, a driving member rotated by a prime mover, a sleeve carried on and rotationally locked to said shaft but capable of movement along the shaft axis, engageable motion transmitting elements carried by said driving member and by said sleeve, resilient means acting on said sleeve to urge said elements into motion transmitting engagement to thereby transfer rotary motion from said driving member to said shaft, an abutment formed on said sleeve presenting an elongated face inclined transversely to the shaft axis, an actuating member mounted for reciprocal motion between a first position in engagement with said abutment face and a second position clearing said abutment face, control means for said actuating member comprising manually operable means for moving said actuating member to its said second position and biasing means for urging said actuating member into its said first position, whereby with said actuating member in its said second position said motion transmitting elements are engaged and rotary motion is transferred from said driving member to said shaft, and when said actuating element is shifted to its said first position rotation of said sleeve causes said actuating element to traverse said abutment face thereby camming said sleeve axially along said shaft to disengage said motion transmitting elements and terminate the drive to said shaft, means for disengaging said motion transmitting elements independently of the position of said actuating member, said means comprising an arm mounted for angular movement adjacent said sleeve, said arm engaging said sleeve and shifting it along the axis of said shaft to disengage said motion transmitting elements as said arm moves toward one limit of its angular motion, a manually movable element, and a one-way driving connection between said manually movable element and said arm whereby manipulation of said movable element actuates said arm toward its said angular motion limit against the force exerted by said resilient means.

References Cited by the Examiner

UNITED STATES PATENTS

| 478,077 | 7/92 | Ball | 74—665 |
| 495,686 | 4/93 | Trethewey | 192—24 |
| 2,027,659 | 1/36 | Weisbord | 192—67 |
| 2,612,974 | 10/52 | Krause | 192—83 |
| 3,065,555 | 11/62 | Rubin | 192—24 X |

FOREIGN PATENTS 822,178 11/51 Germany.

DAVID J. WILLIAMOWSKY, *Primary Examiner.*

THOMAS J. HICKEY, *Examiner.*